Feb. 13, 1934. D. G. ROOS 1,946,948
VEHICLE SPRING SUSPENSION
Filed June 8, 1932 2 Sheets-Sheet 1
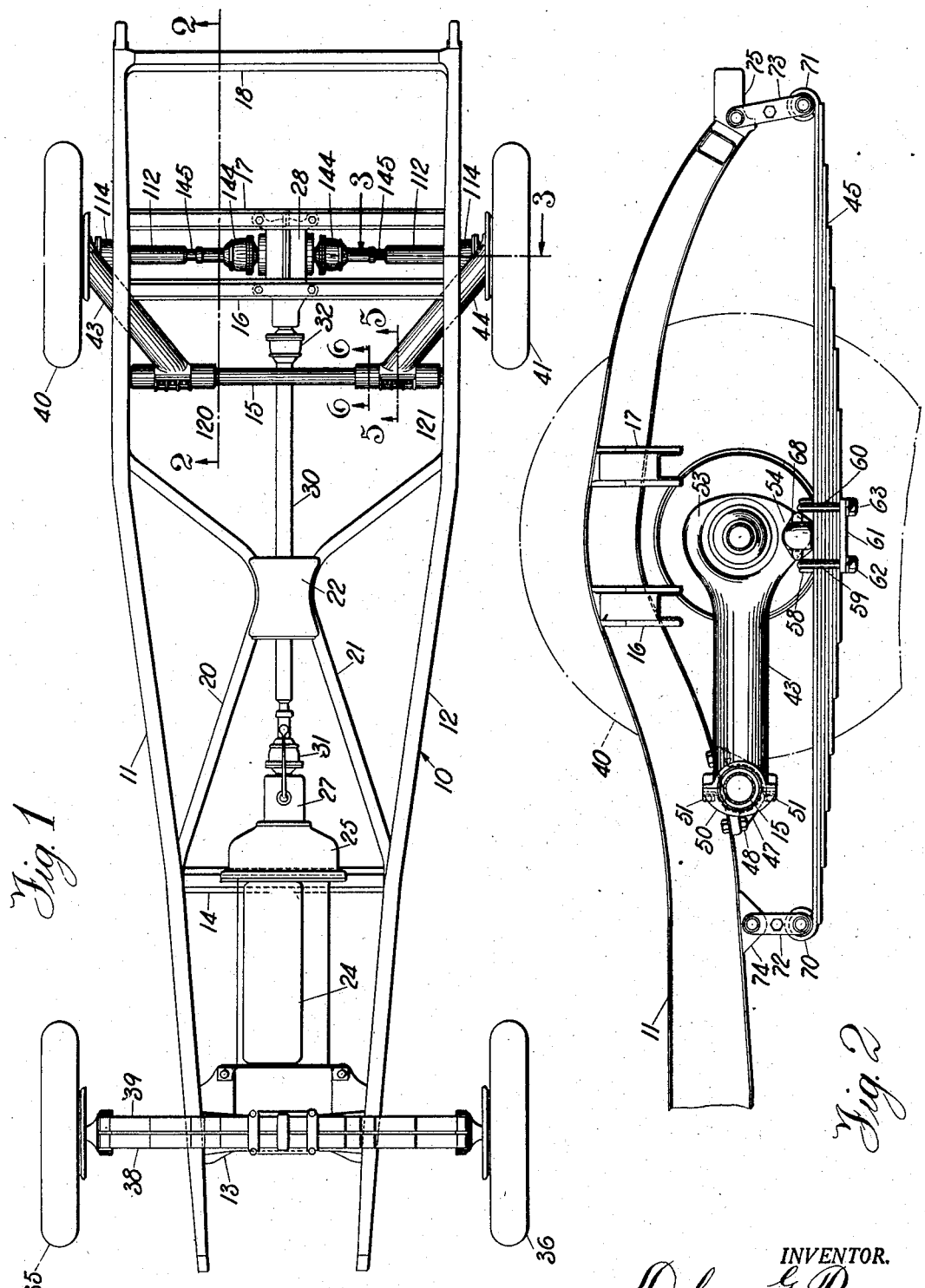

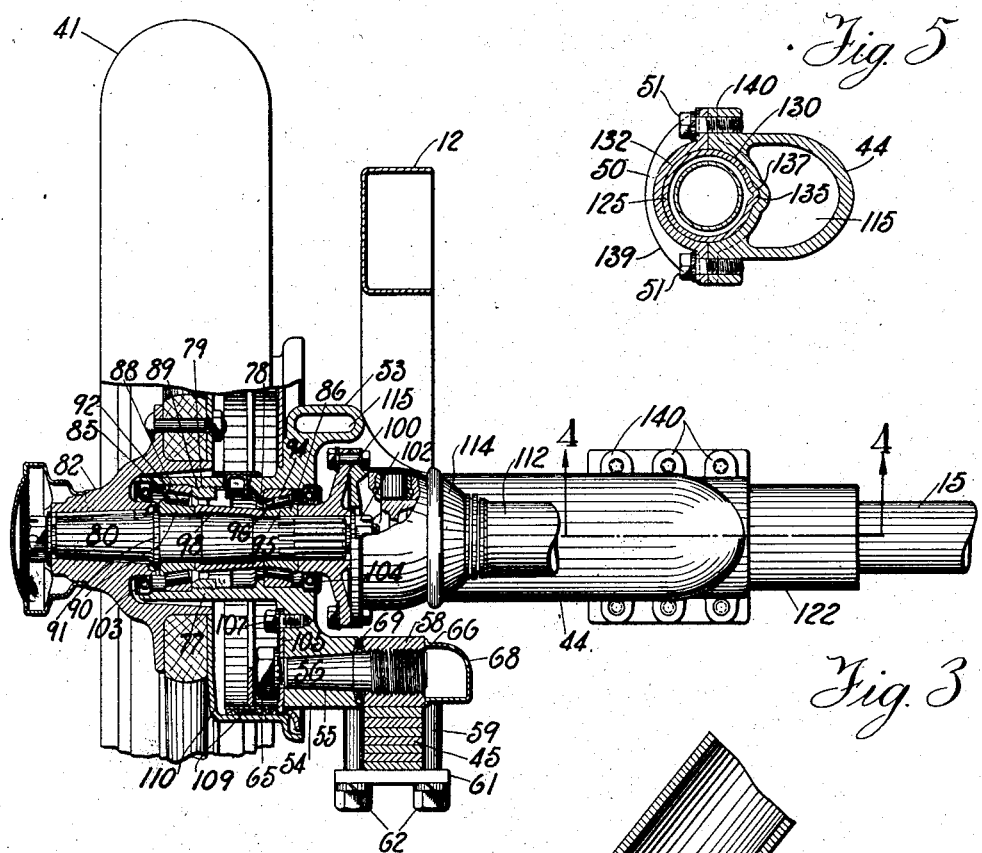

Patented Feb. 13, 1934

1,946,948

UNITED STATES PATENT OFFICE

1,946,948

VEHICLE SPRING SUSPENSION

Delmar G. Roos, South Bend, Ind., assignor to The Studebaker Corporation, South Bend, Ind., a corporation of New Jersey Application June 8, 1932. Serial No. 615,991

7 Claims. (Cl. 280—124)

This invention relates to improvements in vehicle spring suspension, and has for its principal object the provision of means for providing independent spring action between the individual wheels and the chassis frame on the vehicle.

A further object lies in the provision of means independent of the springs for maintaining the rear wheels in alignment with the chassis frame and imparting the driving and braking forces to the frame.

A still further object lies in the provision of cushioning means between the rear wheels and the frame to absorb road shocks imparted to the wheels and prevent such road shocks from being transmitted to the vehicle frame. It is also an object to provide a spring mounting which will firmly support the chassis frame upon the wheels and maintain the wheels in alignment but which at the same time will permit complete freedom of motion of the wheels in response to road shocks.

It is an additional object to provide a device of the character described which is simple and economical to manufacture, easy to install, and which will not readily get out of order in use.

Other objects and advantages will appear as the description proceeds.

The accompanying drawings show an acceptable mechanical embodiment of the idea of the invention. The drawings, however, are not to be taken as limiting the invention, the scope of which is to be measured entirely by the scope of the sub-joined claims.

In the drawings:

Figure 1 is a plan view of a vehicle chassis showing the device of the invention applied thereto.

Figure 2 is a sectional view on an enlarged scale on the line 2—2 of Figure 1 looking in the direction of the arrows.

Figure 3 is a sectional view on an enlarged scale on the line 3—3 of Figure 1, looking in the direction of the arrows.

Figure 4 is a sectional view on the line 4—4 of Figure 3.

Figure 5 is a sectional view on an enlarged scale on the line 5—5 of Figure 1.

Figure 6 is a sectional view on an enlarged scale on the line 6—6 of Figure 1.

Referring to the drawings in detail and particularly to Figure 1, the numeral 10 generally indicates a vehicle chassis frame having side members 11 and 12, cross members 13, 14, 15, 16, 17 and 18, and an X frame comprising two bent members 20 and 21 secured at their ends to the side frame members 11 and 12 and secured together intermediate their length by a plate 22 and a corresponding plate, not shown. An engine 24, clutch 25, and transmission 27 are operatively supported upon the two front cross members 13 and 14 and a differential 28 is supported by the cross members 16 and 17. The transmission and differential are connected by a propeller shaft 30 having universal joints 31 and 32 therein. Front wheels 35 and 36 are connected to the chassis frame 10 by means of a system of transverse springs, two of which are shown at 38 and 39. This front spring suspension and a steering gear, not shown, adapted for use therewith form the subject matter of my co-pending application, Serial No. 615,992 filed on even date herewith.

The rear wheels 40 and 41 are secured to the chassis frame 10 by means of pivoted arms 43 and 44 respectively, and by individual semi-elliptical leaf springs, one of which is shown at 45 in Figure 2. The mountings for the two rear wheels 40 and 41 are exactly similar except that one is right-hand and the other is left-hand in sense, and it will therefore be understood that the elements defined in the following description occur in pairs, one element of each pair being associated with the suspension of one of the wheels 40 or 41 and one with the other.

Still referring to Figure 1, it will be observed that the arms 43 and 44 are pivotally mounted at one end upon the cylindrical or tubular cross member 15 adjacent to the ends of the cross member, and extend rearwardly and outwardly, diagonally beneath the side frame members 11 and 12 and that the wheels 40 and 41 are mounted upon the outer or free ends of the pivoted arms 43 and 44.

Referring now to Figure 2, it will be observed that the ends of the tubular cross member 15 are mounted in brackets, one of which is indicated at 47, secured to the under part of the side frame members 11 and 12 by bolts 48, and that each of the pivoted lever arms comprise two portions, a main portion and a bearing cap, that of the arm 43 being indicated at 50, secured to the main portion by stud bolts 51. At the end opposite the bearing caps the arms are provided with enlarged, wheel mounting portions as indicated at 53 upon the lower sides of which there are downwardly projecting portions as indicated at 54, each provided with an aperture one of which is indicated at 55 in Figure 3, in each of which is secured a bolt or threaded stud 56 and a spring hanger as indicated at 58 is pivotally mounted upon the threaded end portion of each stud. Referring now to Figure 2, it will be observed that the spring hangers are each provided at each end thereof with transverse grooves and are firmly secured to the center of the leaf springs by means of U-bolts as indicated at 59 and 60, which rest in the grooves and at their lower ends pass through apertures in plates, one of which is indicated at 61, the springs being compressed between the spring hangers 58 and the plates 61 by nuts 62 and 63 screw threaded upon the ends of the U-bolts 59 and 60.

Referring to Figure 3, it will be observed that the threaded studs 56 have each a tapered portion fitting in the corresponding tapered aperture 55 in a projection 54 and are secured in the apertures by means of nuts one of which is indicated at 65 bearing against brake dust covers secured to the sides of the members 43 and 44 and that the spring hangers 58 are pivotally mounted upon the portions of the members 56 which project beyond the sides of the members 43 and 44 opposite the nuts 65, the projecting portions of the studs being provided with relatively coarse screw threads as indicated at 66. Cup shaped members one of which is indicated at 68, adapted to contain lubricant, are secured to the spring hangers 58 over the ends of the studs 56, and a resilient washer as indicated at 69 surrounds each stud 56 between the spring hanger and the adjacent surface of the pivoted arms to provide a lubricant seal. The springs 45 are provided at each end thereof with eyes as indicated at 70 and 71 in Figure 2 and spring shackles shown at 72 and 73 respectively connect these eyes with apertured brackets 74 and 75 secured to the lower surfaces of the frame side members 11 and 12. Referring to Figure 3, a sleeve member as shown at 77 is formed integrally with the wheel carrying end 53 of each of the arms 43 and 44, these sleeves being provided internally thereof with annular ribs as indicated at 78 in the ends thereof adjacent to the corresponding ends of the members 43 and 44, and with screw threads as shown at 79 intermediate their lengths. A stub-axle 80 to which one of the wheels 40 or 41 is rigidly secured by means of a hub, one of which is shown at 82, projects axially through each sleeve 77 and is journaled therein by means of outer roller bearings 85 and inner roller bearings 86. The outer roller bearings 85 each comprise an outer race 88, the inner side of which abuts against an annular ring member 89 adjustably secured in each sleeve 77 by means of the screw threads 79 and corresponding screw threads upon the exterior surfaces of the ring members. Each outer roller bearing 85 further comprises an inner race member 90 mounted upon the corresponding stub-axle 80 and restrained from axial motion in one direction thereon by means of an annular shoulder 91 formed on the stub axle. Bearing rollers 92 are disposed between the outer race member 88 and the inner race member 90. The inner roller bearings 86 each comprise an outer race member indicated at 94 abutting at its outer side against the corresponding annular rib 78, an inner race member 95 mounted on the corresponding stub-axle 80, and rollers 96 interposed between the inner and outer race members. A cylindrical spacer 98 is disposed, surrounding each stub-axle 80, between the corresponding inner race members 90 and 95 and a flanged sleeve member 100 is mounted upon the splined inner end of each stub-axle 80 abutting against the side of the inner race member 95 opposite the spacer 98. A nut 102 is threaded upon the inner end of each stub-axle 80 and tends to move the stub-axle relative to the spacer member 98, the inner race 95 and the sleeve member 100 to tighten the roller bearings 85 and 86. Oil seals 103 and 104 are disposed at either end of each sleeve 77 between the sleeve and the corresponding hub 82 and the sleeve and the member 100 respectively. A brake cover plate indicated at 105 is secured to each of the members 43 and 44 by means of stud bolts 107 and the studs 56 and serves to support anchoring and actuating means, not shown, for the brake bands 109 operatively mounted within the brake drums 110. A driving axle 112 is operatively connected with each stub-axle 80 by means of universal joints 114 and the flanged members 100.

As particularly illustrated in Figures 4 and 5, the members 43 and 44 are tubular members and the tubular construction thereof is extended through the ends 53 as illustrated at 115.

Referring now to Figures 1, 4, 5 and 6, it will be observed that tubular sleeves 120 and 121 are mounted upon the cross member 15 adjacent to the ends thereof. Each of these sleeves comprises enlarged end portions indicated at 122 and 123 in Figure 4 connected by a somewhat reduced center portion indicated at 125. Rubber bushings 127 and 128 are disposed between the enlarged portions 122 and 123 respectively of each sleeve and the cross member 15 and are bonded both to the sleeves and to the cross member. The ends of the members 43 and 44 are each provided with a half bearing indicated at 130 in Figure 5 which fits about one half of the reduced portion 125 of the corresponding sleeve 120 or 121. The bearing caps 50 are each provided with a corresponding half bearing indicated at 132 in Figure 5 which fits about the remaining half of the central portion of the tubular sleeve and forms a bearing by means of which the members 43 and 44 are journaled upon the sleeves 120 and 121. In the construction shown, a ridge 135 is provided on the portion 125 of each sleeve and these ridges fit into grooves, one of which is indicated at 137, provided in the half bearings 130 to prevent rotation of the members 43 and 44 relative to the sleeves 120 and 121, whereby relative motion of the members 43 and 44 and the cross member 15 will be taken up by the elasticity of the rubber bushings 127 and 128. The bearing caps 50 are secured to the members 43 and 44 by means of stud bolts indicated at 51, and strengthening ribs 139 are provided on the bearing caps to increase the rigidity thereof. Bosses 140 are formed at spaced intervals on the members 43 and 44 and are apertured and screw threaded internally to receive the screw threaded ends of the bolts 51.

From this description it will be observed that the wheels 40 and 41 are maintained in alignment with the chassis frame by the rigid, pivoted arms 43 and 44, but that vertical motion of the wheels on an arc, the radius of which is one leg of a right triangle, the hypotenuse of which is the member 43 or 44, is permitted by the elasticity of the rubber bushings 127 and 128. This vertical motion of the wheels is resiliently resisted by the springs 45 which support the chassis frame upon the wheels. The slight lateral motion of the wheels due to the arc of the members 43 and 44 is taken care of by the shackle connections 72 and 73 at each end of each spring 45, and the longitudinal component of the road shocks imparted to the wheels are absorbed by the rubber bushings 127 and 128 as the center portions 125 of the sleeves 120 and 121 are spaced from the cross member 15 as clearly indicated in Figure 4.

Power is transmitted to the rear wheels from the differential 28 by means of the driving axles 112, and motion of the wheels relative to the differential is taken care of by the universal joints 114 and the telescopic sections 145 in the axles 112.

From this description it will be observed that I have provided an individual spring suspension for the rear driving wheels of an automotive vehicle by means of which the wheels are firmly connected with the chassis frame and rigidly maintained in alignment therewith and at the same time both the longitudinal and vertical components of road shocks imparted to the wheel are effectively absorbed before reaching the chassis frame.

While, for the sake of simplicity, the construction has not been shown in this illustration, it is obvious that rebound dampeners or shock absorbers may be effectively interposed between the chassis frame and the wheels to dampen the rebound and improve the riding characteristics of the vehicle.

Having now described my invention so that others skilled in the art may clearly understand the same, what I desire to secure by Letters Patent is as follows:

1. A spring suspension for supporting the rear portion of the chassis frame of an automotive vehicle upon the rear wheels of the vehicle comprising, a cross member extending transversely across the rear portion of the chassis frame and rigidly secured thereto, elastic bushings on said cross member, a pair of arms pivotally mounted on said bushings adjacent to the ends of said cross member and extending diagonally beneath the side members of said chassis frame provided at their free ends with wheel carrying sleeves, and a leaf spring centrally pivotally connected to the free end of each of said pivoted arms, the ends of said spring being connected to the corresponding side frame member of said chassis frame.

2. A spring suspension for supporting the rear portion of the chassis frame of an automotive vehicle upon the rear wheels of the vehicle comprising, a tubular cross member extending transversely across the rear portion of the chassis frame and rigidly secured thereto, a pair of arms pivotally mounted on said cross member extending diagonally beneath the side members of said chassis frame and provided at their free ends with wheel carrying sleeves and provided at their pivoted ends with a half-bearing, a bearing cap for each pivoted arm adapted to pivotally secure said arm to said tubular cross member, a tubular member interposed between the bearing in each arm and the tubular cross member, and a leaf spring centrally pivotally connected to the free end of each of said pivoted arms below said wheel carrying sleeves, the ends of said springs being connected to the corresponding side frame members of said chassis frame.

3. A spring suspension for supporting the rear portion of the chassis frame of an automotive vehicle upon the rear wheels of the vehicle comprising, a tubular cross member extending transversely across the rear portion of the chassis frame and rigidly secured thereto, a pair of arms pivotally mounted on said cross member adjacent to the ends thereof extending diagonally beneath the side members of said chassis frame and provided at their free ends with wheel carrying sleeves and provided at their pivoted ends with half-bearings, a bearing cap for securing each pivoted arm to said tubular cross member, a tubular member having enlarged end portions interposed between the bearing in each of said pivoted arms and said cross member, said tubular member being spaced from said cross member, bushings of flexible material interposed between the enlarged ends of said tubular members and said cross member, and a leaf spring centrally pivotally connected to the free end of each of said pivoted arms below said wheel carrying sleeves, the ends of said springs being connected to the corresponding side members of said chassis frame.

4. A spring suspension for supporting the rear portion of the chassis frame of an automotive vehicle upon the rear wheels of the vehicle comprising, a tubular cross member extending transversely across the rear portion of the chassis frame and rigidly secured thereto, a pair of arms pivotally mounted on said cross member adjacent to the ends thereof extending diagonally beneath the side members of said chassis frame provided at their free ends with wheel carrying sleeves and provided at their pivoted ends with half-bearings, a bearing cap for securing each of said pivoted arms to said cross member, a tubular member having enlarged end portions interposed between the bearing in said pivoted arm and said cross member and spaced from said cross member, rubber bushings interposed between the enlarged end portions of said tubular member and said cross member bonded to said tubular bushing member and to said cross member, and a leaf spring centrally pivotally connected to the free end of each of said pivoted arms below said wheel carrying sleeves, the ends of said springs being connected to the corresponding side members of said chassis frame.

5. A spring suspension for supporting the rear portion of the chassis frame of an automotive vehicle upon the rear wheels of the vehicle comprising, a cross member extending transversely across the rear portion of said chassis frame and rigidly secured thereto, a pair of arms pivotally mounted on said cross member adjacent to the ends thereof extending diagonally beneath the side members of said chassis frame provided at their free ends with wheel carrying sleeves and provided at their pivoted ends with half-bearings, a bearing cap for securing each of said pivoted arms upon said cross member, a tubular member interposed between the bearings in each of said pivoted arms and said cross member and spaced from said cross member, flexible bushings interposed between each of said tubular members and said cross member to permit limited rotation of said bushing member relative to said cross member, a longitudinal ridge in the central portion of each of said tubular members, a corresponding groove in the bearing portion of each of said pivoted arms to restrain said arms from rotation relative to said tubular members, and a leaf spring centrally pivotally connected to the free end of each of said pivoted arms below said wheel carrying sleeves, the ends of said springs being connected to the corresponding side members of said chassis frame.

6. A spring suspension for supporting the rear portion of the chassis frame of an automotive vehicle upon the rear wheels of the vehicle comprising, a cross member extending transversely across the rear portion of said chassis frame and rigidly secured thereto, a pair of arms pivotally mounted on said cross member extending diagonally beneath the side members of said chassis frame and provided at their free ends with wheel carrying sleeves, a stud having a projecting screw threaded end secured in the free ends of each of said pivoted arms, a spring hanger pivotally mounted upon the screw threaded end of each of said studs, and a leaf spring centrally secured to each of said spring hangers, the ends of said springs being connected to the corresponding side members of said chassis frame.

7. A spring suspension for supporting the rear portion of the chassis frame of an automotive vehicle upon the rear wheels of the vehicle comprising, a cross member extending transversely across the rear portion of said chassis frame and rigidly secured thereto, a pair of arms pivotally mounted on said cross member adjacent to the ends thereof extending diagonally beneath the side members of said chassis frame and provided at their free ends with wheel carrying sleeves, a stud having an extending screw-threaded end rigidly mounted in the wheel carrying end of each of said pivoted arms, a spring hanger pivotally mounted upon the screw threaded end of each of said studs, a resilient washer interposed between each of said spring hangers and the adjacent surface of the corresponding pivoted arm, an oil reservoir secured to each of said spring hangers opposite the outer end of the corresponding studs, a leaf spring centrally connected to each of said spring hangers, a pair of spaced apertured brackets secured to the lower surface of each of the side members of said chassis frame, and a spring shackle connecting each end of each spring with the corresponding apertured bracket.

DELMAR G. ROOS.